March 15, 1966 J. N. HINCKLEY 3,240,157
ROTARY PUMPS
Filed Dec. 12, 1961 8 Sheets-Sheet 1

INVENTOR.
JOHN N. HINCKLEY
BY LeRoy J. Leishman
AGENT

*INVENTOR.*
JOHN N. HINCKLEY
BY Le Roy J. Leishman

AGENT

March 15, 1966  J. N. HINCKLEY  3,240,157
ROTARY PUMPS

Filed Dec. 12, 1961  8 Sheets-Sheet 3

INVENTOR.
JOHN N. HINCKLEY
BY Le Roy J. Leishman
AGENT

March 15, 1966  J. N. HINCKLEY  3,240,157
ROTARY PUMPS
Filed Dec. 12, 1961  8 Sheets-Sheet 4

INVENTOR.
JOHN N. HINCKLEY
BY LeRoy J. Leishman
AGENT

March 15, 1966     J. N. HINCKLEY     3,240,157
ROTARY PUMPS Filed Dec. 12, 1961     8 Sheets-Sheet 5

INVENTOR.
JOHN N. HINCKLEY
BY LeRoy J. Leishman
AGENT

March 15, 1966  J. N. HINCKLEY  3,240,157
ROTARY PUMPS

Filed Dec. 12, 1961  8 Sheets-Sheet 6

INVENTOR.
JOHN N. HINCKLEY
BY LeRoy J. Leishman
AGENT

March 15, 1966 J. N. HINCKLEY 3,240,157
ROTARY PUMPS
Filed Dec. 12, 1961 8 Sheets-Sheet 7

INVENTOR.
JOHN N. HINCKLEY
BY LeRoy J. Leishman
AGENT

March 15, 1966 J. N. HINCKLEY 3,240,157
ROTARY PUMPS
Filed Dec. 12, 1961 8 Sheets-Sheet 8

INVENTOR.
JOHN N. HINCKLEY
BY Le Roy J. Leishman
AGENT

United States Patent Office 3,240,157
Patented Mar. 15, 1966

3,240,157
ROTARY PUMPS
John N. Hinckley, 16052 Leffingwell Road,
Whittier, Calif.
Filed Dec. 12, 1961, Ser. No. 158,662
3 Claims. (Cl. 103—124)

The invention herein described pertains to pumps, and more particularly to rotary pumps of the positive type used for fluids, mixtures and semi-solids, such, for example, as the food industry and dairy industries require for milk, cottage cheese and other flowable products.

In the pumps of the type with which we are concerned, extreme sanitation and cleanliness are the prime requirements, and it is highly important that the design be such that the cleaning may be easily and quickly accomplished. In accordance with these requirements, it is important that narrow crevices, sharp corners and deep holes be avoided in the design. The pump herein described embodies many improvements over those illustrated and described in my Patents No. 2,717,555 and No. 2,882,828, which issued on September 13, 1955, and April 21, 1959, respectively.

Because of the considerations hereinabove mentioned, the principal objects of my invention are to produce a pump for liquids, semi-solids and mixtures of solids and liquids that is efficient and relatively inexpensive to manufacture, and to provide a design that will permit the pump to be easily and thoroughly cleaned in place, as by flushing, or manually cleaned after first partially disassembling.

In order to achieve these ends, my invention has the following subsidiary objects:

(1) The provision of an impeller and wiper-vane combination in which the wiper is kept in contact with the periphery of the rotor by gravity or magnetic means as an alternative to the usual loading spring;

(2) The provision of an efficient seal between the liquid containing cavity of my pump and the drive-shaft and its bearings;

(3) The provision of an effective cushion to counteract axial thrusts of the impeller or rotor assembly;

(4) The formation of a cavity for the rotor and the material to be pumped in which necessary irregularities in the internal contour will be supplied by inserts rather than by expensive machined contouring.

Still other objects will appear as the specification proceeds.

In the preferred embodiment of my device, a generally cylindrical casing 1 is closed at opposite ends by the flat plates 2 and 3 to form a chamber for the principal parts of my pump, and a housing 4 supports and protects the bearings for the drive shaft. The casing 1 has an inlet port 7 and an outlet port 8.

Figure 5:
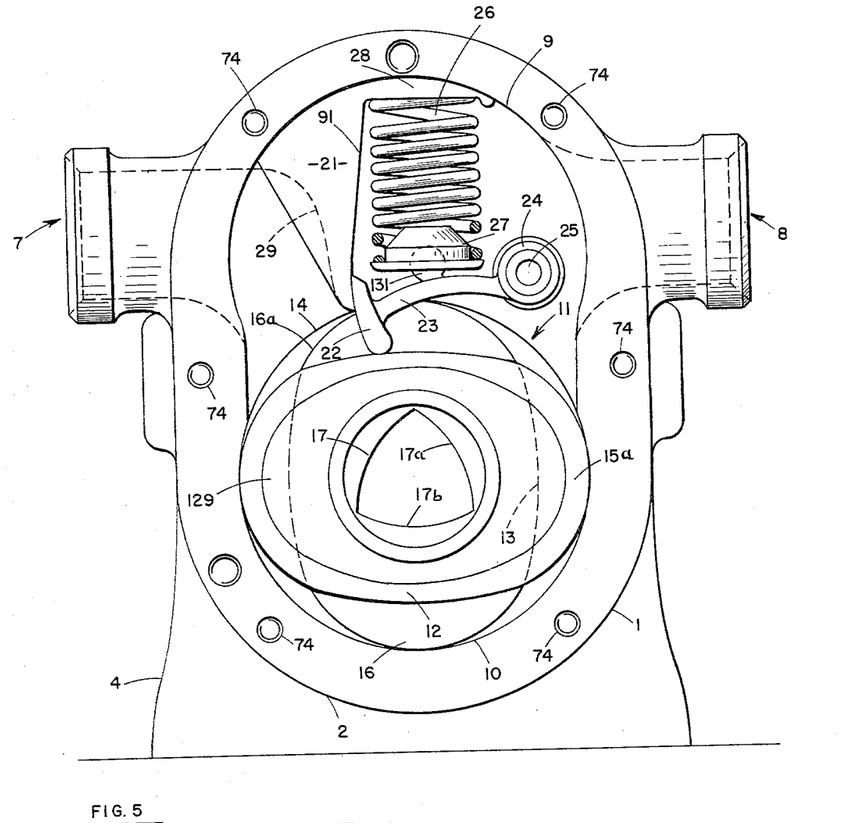
FIG. 5 is a cross-section taken on line 5—5 of FIG. 1.

For simplicity of manufacture and to provide an easily cleanable interior surface, I prefer to use a casing similar to that shown in FIG. 5, where the outer end plate has been removed to show the interior construction. It will be observed that a cross-section of the casing reveals an oblong body with an upper semi-cylindrical bore 9 and an overlapping lower semi-cylindrical bore 10. The rotor 11 fits in the lower bore 10. The rotor may be generally of the construction disclosed in my earlier Patents No. 2,717,555 and No. 2,882,828, both of which have been mentioned previously.

Figures 7, 8, 9, 16:
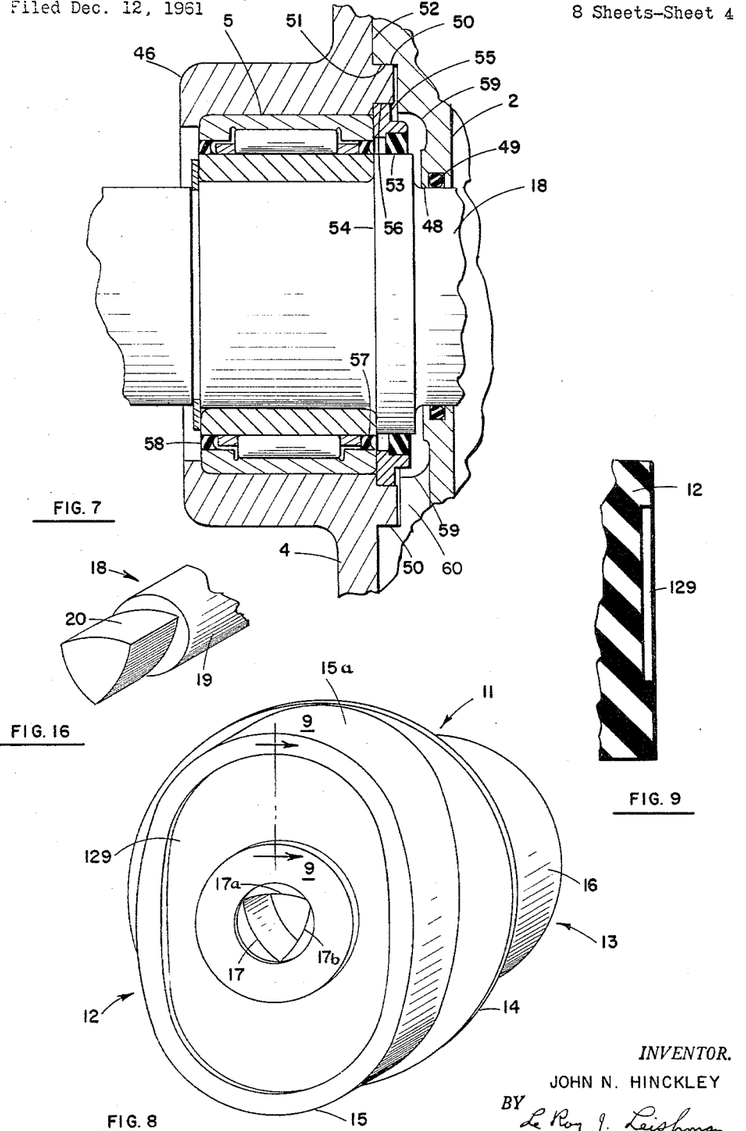
FIG. 7 is a partial longitudinal section of the rear plate of the pump casing and the adjacent portion of the bearing housing, showing the cooperation between the two and the manner of producing an effective seal around the shaft between the casing and the bearings for the shaft.
FIG. 8 is an isometric view of the rotor assembly, showing two impellers with a separating disc and certain other structural features of the rotor.
FIG. 9 is a section taken on line 9—9 of FIG. 8.
FIG. 16 (on the fourth page of the drawings) is a broken-away isometric view of the outer portion of the drive shaft that drives the impeller assembly of FIG. 8.

A somewhat improved rotor, shown in an isometric view in FIG. 8, has a cosine shape and comprises two impellers 12 and 13 disposed at right angles to each other with a circular disc 14 between them. Both of these impellers are of symmetrical design, and each has a short diameter and a long diameter that are at right angles to each other to form two lobes. Impeller 12 comprises lobes 15 and 15a, and impeller 13 has two lobes 16 and 16a, FIG. 5.

At least the periphery of each of these impellers is formed of a rubber-like material or a ceramic substance and the entire rotor is keyed to a drive shaft 18 in any of a variety of ways. One suitable keying arrangement is illustrated in FIGS. 5, 8 and 16. It will be observed that the center opening in impeller 12 is not round but that the recess has three arcuate sides 17, 17a and 17b, whose radii are each greater than the greatest distance from the associated side to the axis of the impeller. This three-arcuate-sided opening may communicate with a cylindrical opening in impeller 13. The reduced outer end 20 of the drive shaft must of course have arcuate sides, as illustrated in FIG. 16 to conform with the arcuate sides 17, 17a and 17b of the recess in the outer end of the double impeller structure. In assembly, the end of the rotor structure having the cylindrical opening must first be slipped over the end 20 of the drive shaft 18 and then over the round portion 19 of the shaft.

The keying arrangement just described has the great advantage that all portions of the three-arcuate-sided part of the shaft are in driving contact with the contiguous portions of the recess bounded by sides 17, 17a and 17b.

Figure 6:
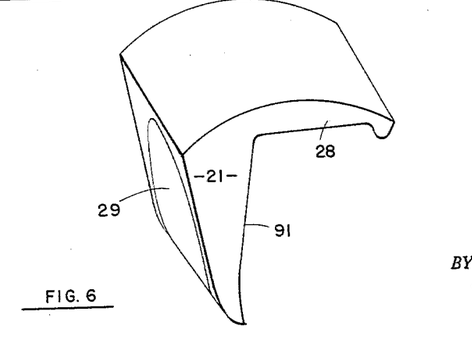
FIG. 6 is an isometric view of a removable partition that is a component of the structure shown in FIG. 5.

In the embodiment illustrated in FIG. 5, a removably mounted partition 21, also shown in FIG. 6, extends from the upper interior surface or ceiling of the pump to the disc 14 that is positioned between the two impellers. The surface 91 of this partition is parallel to the axis of the rotor.

This removably mounted partition constitutes an important improvement over the partition that is integrally formed in the corresponding upper portion of the pumps described in my earlier patents above mentioned. The integral partitions are an impediment to the easy cleaning and polishing of the pump, but the removal of partition 21 makes the partition itself easy to clean and renders the upper semi-cylindrical cavity shown in FIG. 5 free from obstructions. The upper surface of partition 21 is arcuately formed to match the arcuate upper inner surface of the pump and may be attached thereto by any convenient means.

The vane 22 constitutes a movable partition extending from the stationary partition 21 to the periphery of impeller 12. This vane is integral with an arm 23 which terminates in a boss 24, and the construction is generally the same as the construction of the corresponding movable vane member in my earlier patents above referred to. It will be understood that another similar vane, arm and hub structure cooperates with partition 21 and the other impeller 13 on the opposite side of the circular disc 14—all substantially as shown in the aforementioned earlier patents. Hub 24 and the corresponding hub that cooperates with the other vane are mounted on a removable shaft 25, the ends of which may be removably inserted in appropriate holes in the two end plates, just as shaft 49 is mounted in the structure illustrated in FIG. 5 of my aforementioned Patent No. 2,882,828. A compression spring 26 expands between extension 28 of partition 21 and the spring cup or cap 27 that pivots on the ball 131 integrally attached to arm 23. It will of course be understood that another identical spring cooperates with the aforementioned other vane, arm and hub structure associated with impeller 13 on the opposite side of the central disc 14.

The rear surface 29 of partition 21 is hollowed out as indicated in FIGS. 5 and 6 in order to present a smooth surface to direct the inflowing substances from port 7 toward the impellers.

Inasmuch as the two impellers are at right angles to each other, it will readily be understood that the two-cycle operation of each impeller is 90 degrees out of phase with that of the other. This means that the pressure exerted by the inflowing material against one side of disc 14 is likewise 90 degrees out of phase with the pressure exerted against the opposite side of the disc. In each case the pressure urges the disc and the whole rotor assembly toward the opposite end plate. This tends to create vibration. Means have been introduced in the pump illustrated in FIGS. 3, 4, 5, 8 and 9 to cushion the impellers and the end plates against these pressures that tend to cause rhythmic oscillation of the impeller assembly along the shaft. To effect such cushioning, I create connected or continuous shallow recesses 129 in the end surfaces of the two lobes of each impeller, as illustrated in FIGS. 3, 4, 5, 8, 9 and 14, and I also provided two elongated recesses 30 and 31, FIGS. 3 and 4 in each of the two end plates. As the impellers turn, the shallow recesses 129 in the outer surfaces of the lobes traverse the elongated grooves or cavities 30 and 31 in each of the end plates. As each traversal begins, some of the milk or other fluid being impelled through the pump, becomes entrained between the end of impellers and the inner surfaces of the end plates. This entrapped fluid acts as a cushion against the aforementioned longitudinal oscillation or vibration of the rotor or impeller assembly. The elimination or reduction of this reciprocating force on the impeller assembly of course produces smoother and quieter operation and increases the life of the pump.

Figure 10:
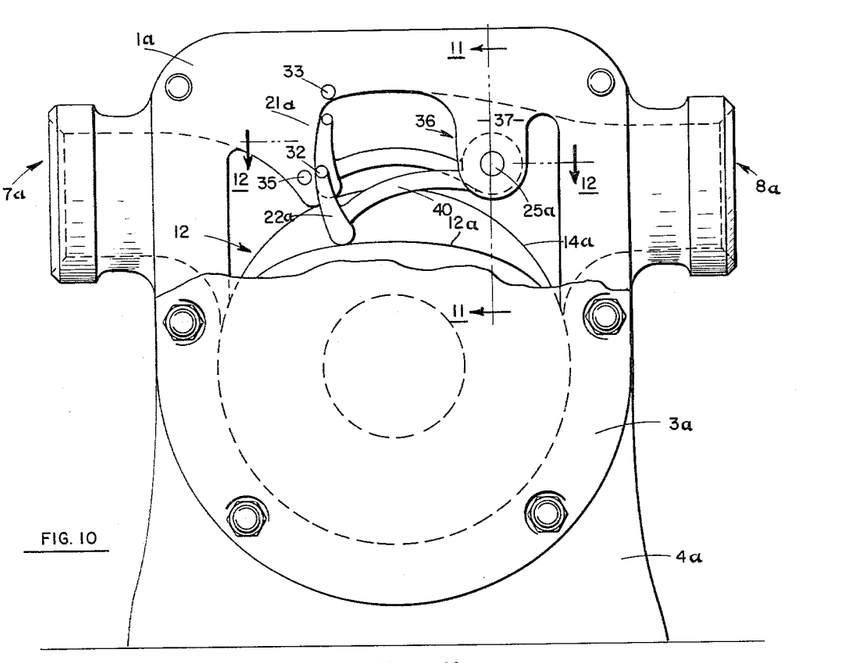
FIG. 10 is a view similar to that of FIG. 5, but with a portion of the front end plate broken away to show a modified construction constituting another embodiment of my invention.
Figure 11:
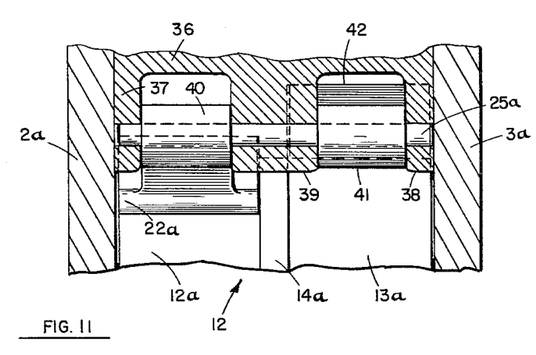
FIG. 11 is a section taken on line 11—11 of FIG. 10.
Figure 12:
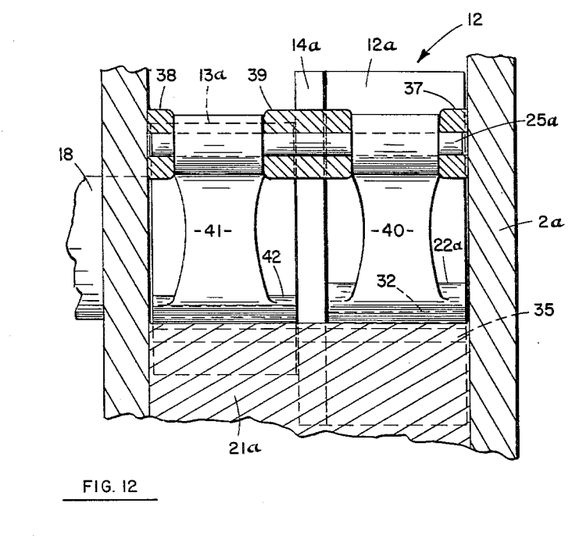
FIG. 12 is a section taken on line 12—12 of FIG. 10, but rotated 90° counter-clockwise.

FIGS. 10, 11 and 12 illustrate an arrangement that not only avoids the use of loading springs, such as spring 26 in FIG. 5, to keep the reciprocating partitions or vanes in contact with the peripheries of the impellers, but also results in a reduction of the over-all height of the mechanism. In this species, vane 22a carries a bar magnet 32 which extends across the vane parallel to the vane's axis of arcuate movement. A second bar magnet 33, supported in the upper portion of the pump near the depending structure 21a, extends parallel to bar magnet 32 and is so arranged that the two magnets repel each other. A third bar magnet 35 is carried by partition 21a and extends parallel to the other two bar magnets, and the poles of the third magnet are so arranged that this magnet attracts magnet 32. The combined repelling action of magnet 33 and attraction of magnet 35 on the magnet 32 embodied in vane 22a urges the vane into continuous contact with the periphery of impeller 12. It will of course be understood that another vane and supporting arm assembly is also movable angularly around shaft 25a, carried by bracket 36 which depends from the upper internal surface of the pump. This second vane of course follows the countour of a second impeller disposed with respect to impeller 12a in much the same manner that impeller 13 in FIG. 8 is disposed with respect to impeller 12.

The supporting means 36 that journals shaft 25a is attached to, or integral with, the upper inside surface of the pump cavity and comprises three sections—37, 38 and 39, FIGS. 11 and 12, all having appropriate holes therein for supporting the shaft 25a.

As will be seen in FIG. 12, the arm 40 of vane 22a is cut back on the sides near the hub end to clear supports 37 and 39 and arm 41, which is integral with vane 42, is similarly recessed at the outer edge near the hub end to clear supports 39 and 38.

The vane-arm assemblies are spaced apart as indicated in FIG. 12 so that vanes 22a and 42 will straddle the disc 14a that is interposed between the two impellers, and the center depending bracket 39 of the three-element supporting means 36 is made wider than the outer sections 37 and 38 to permit the two vane assemblies to be interchangeable, its actual width, as shown in the FIGS. 11 and 12, being equal to the combined width of sections 37 and 38 plus the distance between vanes 42 and 22a.

Figures 14, 15:
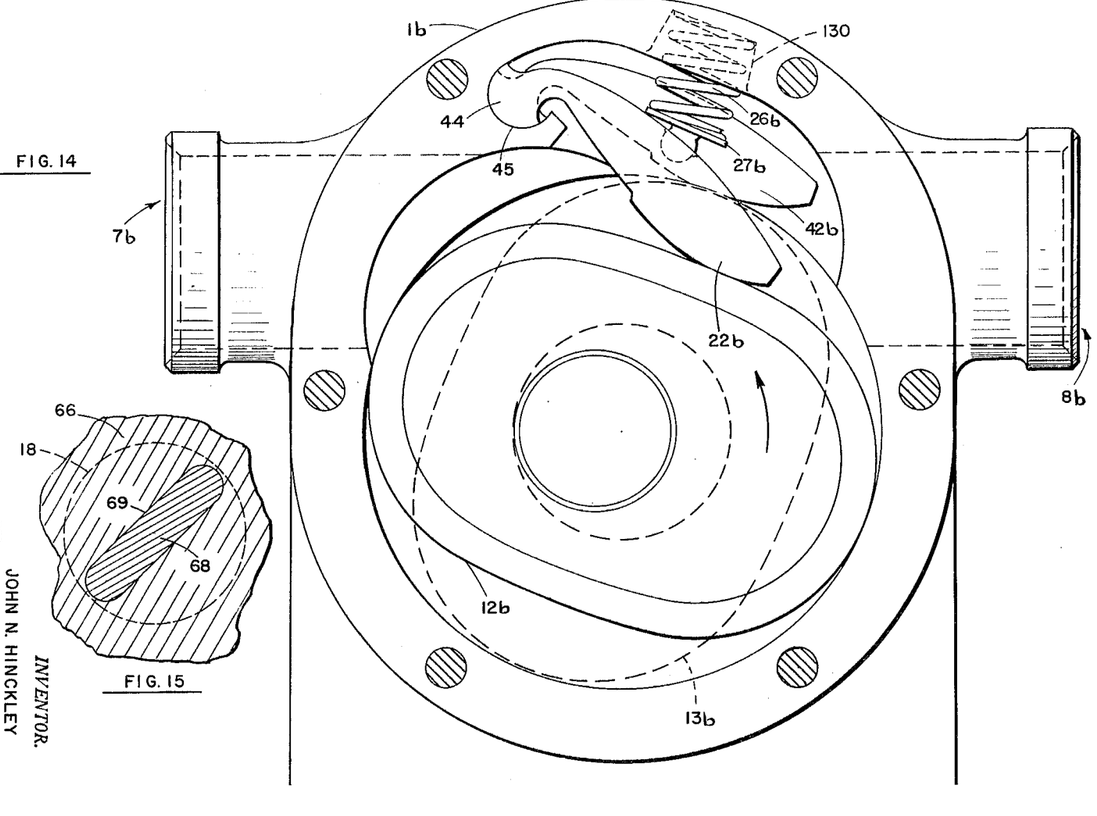
FIG. 14 is another view similar to FIGS. 3, 5 and 10, but showing still another modification or embodiment of my invention.
FIG. 15 illustrates another of my alternative provisions of keying an impeller to the drive shaft.

FIG. 14 shows another arrangement for keeping the equivalents of vanes in contact with the peripheries of the impellers. The instrumentalities that serve this purpose are the elongated members, or oscillating partitions, 22b and 42b, whose pivotal ends are semi-cylindrical in cross-section. In FIG. 14, the elongated member 22b has a semi-cylindrical pivotal end 44, which nests in a mating semi-cylindrical socket 45, which also serves to retain the identical pivotal end of oscillating partition 42b. The semi-cylindrical socket is formed in the body of the casing 1b.

It will be noted that the lower surface of member 22b is curved away from the periphery of impeller 12b in order to provide an axially extending line-contact therewith. Member 42b has a similar or identical curved lower surface for the same kind of cooperation with the periphery of impeller 13b. Gravity alone, or light springs, holds them in contact with the peripheries of the impellers with which they respectively cooperate.

Figure 17:
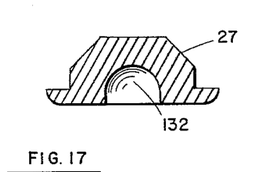
FIGS. 17 and 18 (on the sixth page of the drawings) are illustrations of alternative members for imposition between compression springs such as those shown in FIGS. 5 and 14 and the associated oscillating partitions.
Figure 18:
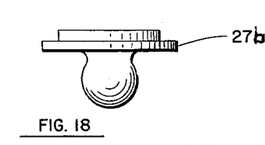

When springs are used, a socket, such as socket 130, is provided in the upper portion of casing 1b for each of the two springs, and a cap or cup 27b is attached to member 22b and 42b to receive the springs' lower ends. The cups or caps may be like elements 27 in FIGS. 5 and 17, or like element 27b in FIG. 18. When the type shown in FIGS. 5 and 17 are used, a ball 131 (FIG. 5) is attached to the oscillating partition member by any appropriate means. The cup 27 has a socket-like recess 132 in its underside to receive the ball and to turn freely thereon. When the type shown in FIG. 18, is employed, the ball and socket arrangement is reversed, the ball being integral with member 27b and the socket being formed in the upper surface of the oscillating member. Either type of spring-receiving element may of course be used with any of the kinds of oscillating partitions herein shown and described, or with any substitute structure.

It is of the utmost importance in pumps of the type with which we are here concerned that the liquid or semi-liquid material being impelled be kept from coming in contact with the shaft bearings. I prefer to provide the drive shaft, such as shaft 18 in FIGS. 1, 7 and 16, with a pair of bearings, such as bearing 5 in the bearing box 46, FIGS. 1 and 7, and a second similar bearing (not shown) in box 47, FIG. 1. Both of these boxes may be integral with the housing 4. End plate 2 of the pump casing has a central opening 48, FIGS. 1 and 7, to permit shaft 18 to pass therethrough, as indicated in FIG. 7. The inner periphery of this central opening 48 is provided with an annular groove in which nests an O-ring, Quadring, or the equivalent. This ring 49 embraces shaft 18 and provides a barrier to prevent the material that is being impelled through the pump from passing through the opening 48.

In order to assure substantially perfect alignment of the bearing 5 and the opening 48 with its trapped O-ring 49 within the end plate 2, I provide the surface of the bearing housing that is adjacent to plate 2 with an annular boss or protrusion 50 that mates with an annular recess 51 in plate 2 around the central opening 48. The annular boss 50 and the cavity 51 in plate 2 of course have mating contours; in fact, I prefer to provide the boss 50 with an abrupt shoulder to fit the cylindrical sides of the cavity 51 when the front surface 52 of the bearing housing is in firm contact with the adjacent surface of endplate 2. The snug fit of boss 50 within cavity 51 assures highly satisfactory alignment of O-ring 49 with the shaft 18.

I prefer to use an additional, or second, barrier or resilient annular sealing member, such as the rubber or leather ring 53 that hugs the enlarged section 54. A shaft seal back-up ring 55 is interposed between the bearing seal 53 and the internal shoulder 56 within the boss 50 of the bearing housing. Still a third seal is provided by the neoprene or equivalent bearing ring 57 that also serves to hold the lubricant within the bearing and keep moisture out. Another bearing seal 58 is also employed on the opposite side of the bearing.

As an added safeguard against the passage of liquid from the interior of the pump casing into the bearing 5, an additional annular recess 59 is formed in the endplate 2. This recess communicates with a drainage channel 60, extending to the bottom of the pump casing. Any fluid that escapes from the interior of the pump despite the sealing action of the O-ring 49 is almost entirely drained off by gravity through the passageway 60 before reaching the bearing seals 53 and 57.

Figure 13:
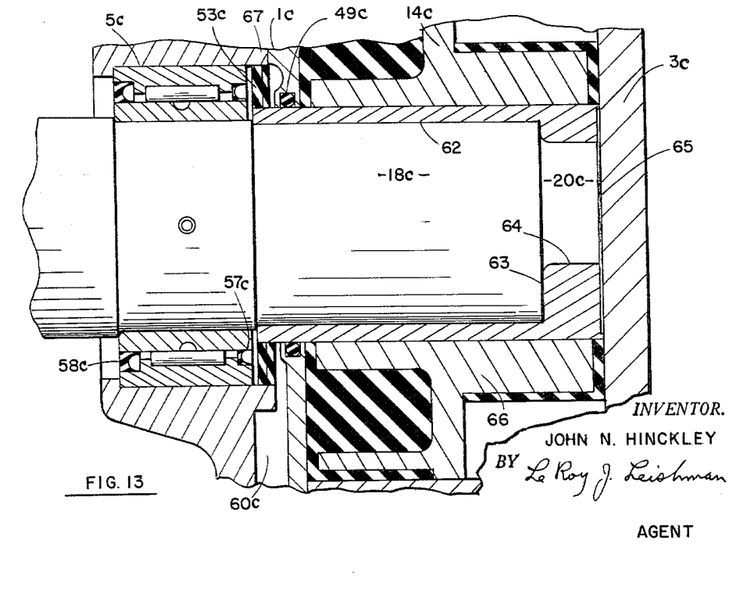
FIG. 13 is a longitudinal section, partly broken away of another species of my invention in which novel and multiple sealing means are used between the impeller and a specially formed driving shaft employing a unique arrangement for keying it to the rotor.

FIG. 13 illustrates another arrangement in which the sealing provisions have been carried a step further. In this embodiment of my invention, the shaft 18c is provided with an eccentrically disposed reduced end 20c, which fits in a sleeve 62 having a thick wall or bottom 63 at its outer end. This thick wall is drilled or bored eccentrically so that when the main portion of shaft 18c is fitting inside the relatively thin walls of the sleeve 62, the eccentric reduced end of the shaft will fit in the eccentric mating opening 64 in the end of the sleeve. A disc 65 is welded or cemented to the outer end of sleeve 62 to provide a leak-proof seal.

The rotor 66 is centrally apertured to fit over the sleeve 62 to which it should be welded or cemented. Any of the fluid being impelled through the pump by the rotor 66 can thus not reach the shaft 18c proper, but the entire rotor assembly including the sleeve 62 may be moved longitudinally with respect to the shaft 18c. The eccentric reduced end 20c fitting in the mating eccentric opening 64 avoids any relative angular movement between the sleeve and the shaft and provides an excellent keying arrangement whereby the shaft rotates the impeller assembly 66.

In this embodiment of my invention, the central opening in the endplate 1c is large enough to receive the sleeve 62, and a sealing ring 49c, which is the counterpart of the O-ring 49, FIG. 7, nests in an annular recess on the inner wall of the circular opening and fits snugly against the sleeve 62. The leather or rubber-like ring 53c expands between the periphery of the sleeve 62 and the inner surface of the annular boss 67 that protrudes from the housing of the bearing 5c. The bearing itself has the usual lubrication-retaining seals 57c and 58c and greasefittings for proper lubrication. A drain opening 60c extends from the sleeve 62 to the bottom of the housing, forming a counterpart of drain 60 in FIG. 7, and any fluid from the pump that escapes by the O-ring 49c is mostly drained through the recess 60c without exerting any pressure against the resilient annular seal 53c that might tend to cause the fluid to bypass this second resilient seal.

We have heretofore explained two different keying arrangements whereby the impeller assembly is permitted to be moved axially of the driving shaft while assuring effective driving contact between the drive shaft and the driven member. Still a third keying arrangement that satisfies these requirements is shown in FIG. 15. In this structure, a tongue 58 is formed on the end of the drive shaft, and this cooperates with a mating groove 69 in the rotor assembly that comprises the impellers.

Another important feature of my pump is the ease with which it may be assembled and disassembled. Dowels 70 and 71, FIG. 1, extending into both the end plate 2 and the casing 1, assure the perfect alignment of the casing with respect to this end plate, and a second group of dowels 72 and 73 assure the similar alignment of the outer end plate 3 with respect to the casing. These dowels, however, may be omitted if the oscillating partitions are supported in any of the ways illustrated and described herein, rather than as shown in my aforementioned earlier patents, and if some such means as that illustrated in FIG. 7 is used to assure a perfect fit between the bearing housing and the casing in which the impellers are located.

Figures 1, 2:
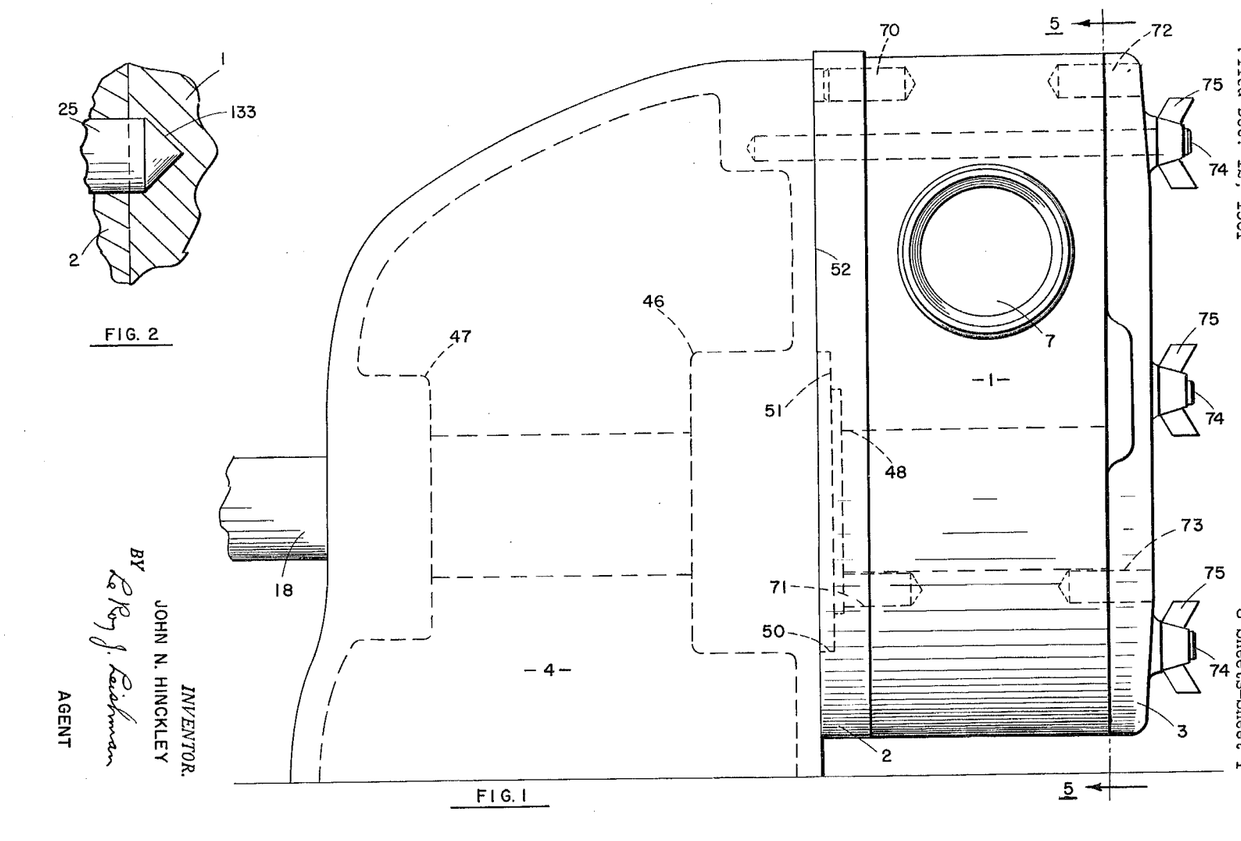
FIG. 1 is a side elevation of one form of my pump showing the simplicity of the impeller casing and the shaft housing, together with certain internal parts in phantom.
FIG. 2 illustrates a method of journaling the oscillating vane mounting shaft in the end plates of my pump housing.

Long bolts 74 extend through the wall or body of the casing 1 and also through the end plate 2 and are threaded into the front wall or surface of the housing 4. The outer ends of the bolts 74 are threaded to receive the wing nuts 75.

It will be seen that by removing these wing nuts, the front plate 3, the casing 1, and the end plate 2 may all be successively removed from the bearing housing 4. The impeller assembly is easily slidable from the driving shaft for cleaning purposes, and any of the vane and arm assemblies may readily be dismantled regardless of whether the arm assembly is spring loaded, magnetically loaded or held against the peripheries of the impellers by gravity.

Figure 19:
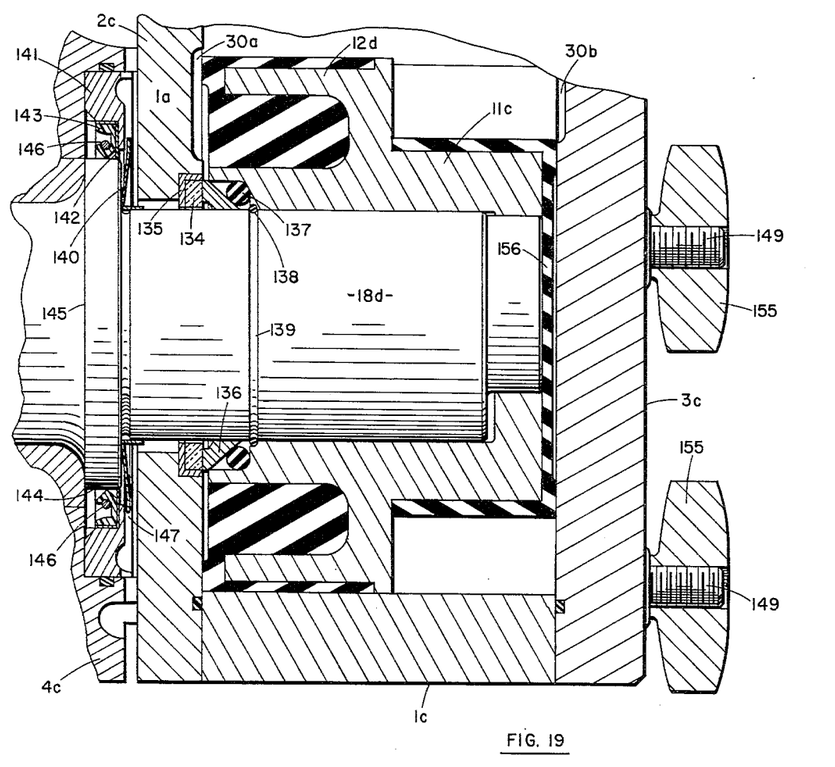
FIG. 19 is a longitudinal section of another form of my pump using an impeller that is completely covered with rubber excepting for the central bore that receives the shaft. This figure also illustrates modified ceiling arrangements for preventing the fluid from getting into the shaft bearings.

FIG. 19 illustrates still other modifications in the rotor as well as in the sealing means. The rotor 11c is not formed of a resilient material throughout, but most of the exterior surface is coated with or formed of a resilient material such as neoprene. A resilient substance 156 also completely encases or coats the interior or cored portion excepting for the central opening that receives and fits the drive shaft 18d.

Figure 3:
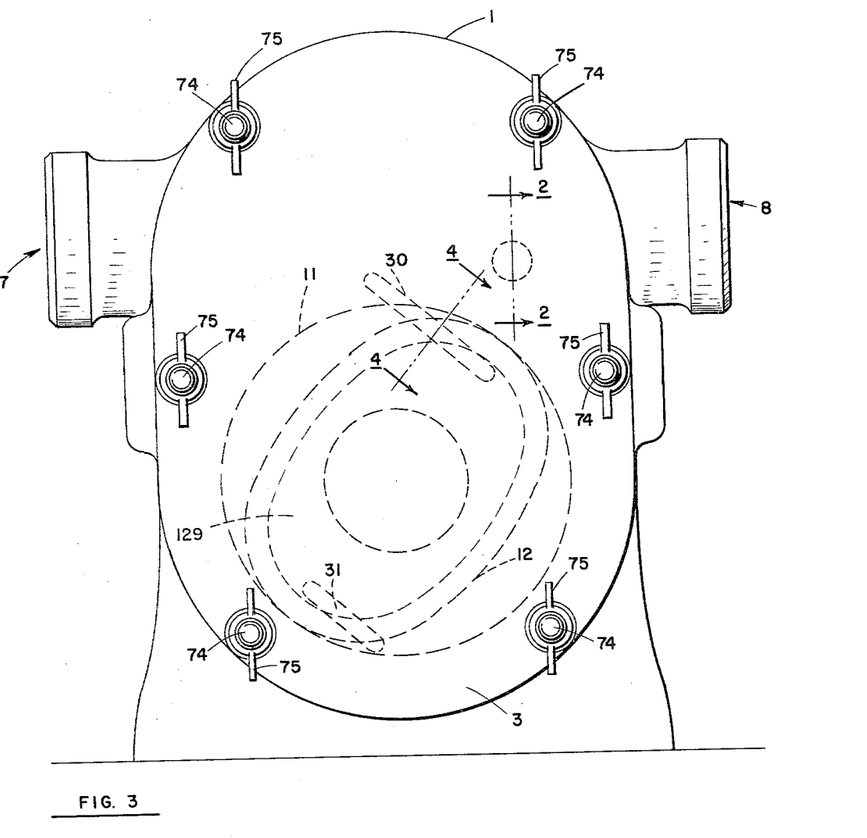
FIG. 3 is a front end view of my pump showing certain parts in phantom, including grooves on the inner surfaces of the end plates that cooperate with cavities in the ends of the impellers to entrap some of the material being pumped so that this material may act as a cushion to maintain a hydraulic balance of the impellers for minimizing or removing end play.
Figure 4:
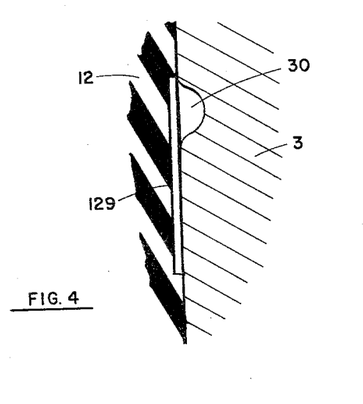
FIG. 4 is a partial cross-section taken on line 4—4 of FIG. 3, showing the cooperation of the aforementioned slot 5 and cavities.

Recess 30a corresponds to recess 30 in FIGS. 3 and 4. Recess 30b is the cooperating recess in the opposite end plate 3c, whereby cushioning fluid is entrained by the opposite impeller. This modification utilizes no recess in the end plates corresponding to recess 31 in FIG. 3, as it has been found that a better hydraulic balance is obtained with only the single set of oppositely disposed recesses in the end plates.

FIG. 19 also illustrates a different form of seal between the impeller casing and the bearing housing. A non-rotating ring 134 that may be suitably formed of carbon or a ceramic material surrounds the shaft 18d and is held in spaced relationship thereto by means of a gasket ring 135 having an L-shaped cross-section Ring 135 nests in an annular recess in the end plate 1a. Ring 136 fits shaft 18d closely but is free to rotate thereon, or rather to permit the shaft 18d to rotate freely therein. An O-ring 137 nests in an appropriately formed recess in the impeller 12d and presses on the sloping side of ring 136, urging the opposite vertical face of ring 136 against the ceramic or carbon ring 134. If ring 134 is formed of carbon, ring 136 will operate very satisfactorily therewith if it is formed of a ceramic, but if ring 134 is molded from a ceramic material, then it is well to use carbon for ring 136. The retainer ring 138 is held by its own resilience in groove 139 in the shaft 18d. The wire ring 138 merely serves to prevent the O-ring 137 from slipping off the shaft when the rotor 11c is removed for cleaning or other purposes.

The generally L-shaped resilient ring 140 fits closely against shaft 18d and serves to throw off any fluid that passes rings 136 and 134 and the gasket 135, thus preventing such fluid from reaching the vicinity of the bearings. An annular casting 141 has a radially extending inner lip that is interposed between the outer portion of ring 140 and another sealing assembly that comprises parts 142, 143 and 146. Part 142 is an annular ring having an L-shaped cross-section. Into this is cemented a resilient rubber-like ring 143. The garter-ring 146 urges the portion of ring 143 immediately adjoining the periphery 144 of the enlarged section 145 of the drive shaft into sealing engagement therewith. Fluid that may pass the sealing members to the right of ring 140 and which is thrown outward by this ring is received in the annular recess 147 which communicates with the drain described in connection with previously discussed figures.

Figure 20:
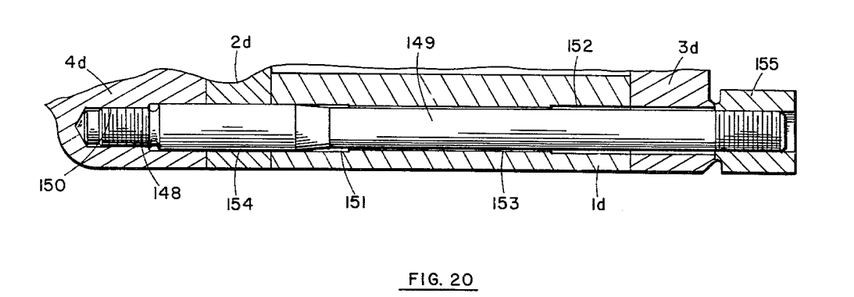
FIG. 20 illustrates the use of a combination dowel and screw for attaching the endplates to the central housing.

FIG. 20, as already mentioned, illustrates a combination bolt and dowel arrangement that not only assures the proper positioning of the end plates 2c and 3c with respect to the casing 1c, but also secures these members to the bearing housing 4c. Perhaps the most important feature of this arrangement, however, is that it permits the casing to be reversed with respect to the end plates for either clockwise or counterclockwise operation of the rotor, thus allowing the fluid to be pumped therethrough in whichever direction may be most convenient for the particular installation.

The threaded end 148 of the dowel-bolt 149 is screwed into the correspondingly threaded hole 150 in the bearing housing 4d. A bolt hole 153 extends all the way through the wall of casing 1d. As shown in the figure, it has a counterbore 151 on the left side to match the large diameter 154 of the bolt 149. An appropriate opening through end plate 2d also closely fits the enlarged portion 154, which constitutes the dowel section of the dowel-bolt 149.

In assembly, the bolt 149 is first inserted through the plate 2d and then screwed into the bearing housing 4d. The portion of the bolt 149 to the right of the enlarged section 154 is reduced in diameter to permit the casing 1d to be slipped over the bolt, whose smaller diameter fits the narrower opening in the housing 1d between the two counterbores 151 and 152. With this arrangement, it will readily be seen that the end of the casing that normally adjoins end plate 3d could be reversed and placed against the end plate 2d, thus permitting a reversal of the positions of the inlet and outlet ports of the pump.

After the end plate 3d has been slipped over the outer end of the bolt, the wing nut 155 is threaded thereon and tightened into position to hold the entire assembly firmly together.

It will of course be understood that other dowel-bolts such as dowel-bolt 149 are used in other locations around the end plates and pump casing to hold them firmly together. The required plurality of bolts is indicated in FIG. 19, where two such bolts are shown with their associated wing nuts 155.

The embodiments hereinbefore described are merely illustrative and by no means exhaust the forms that my invention may take. Any of the elements set forth in the appended claims may be replaced by others that perform the same function, and the various components may be transposed and rearranged without departing from the broad spirit of my invention as succinctly set forth in the claims that follow.

My claims are:

1. In a pump, a combination including: a casing having inlet and outlet ports; a rotor having a maximum diameter substantially at right angles to a minimum diameter to form an impeller with opposite lobes, said impeller so rotatably mounted within said casing that its lobes traverse an arcuate portion of the inner surface thereof; a stationary partition depending from a second portion of said inner surface substantially opposite from said arcuate portion, said partition extending to a line that is substantially as far from the axis of said rotor as is the aforementioned arcuate surface and so disposed within said casing that it is substantially parallel to said axis; an arcuately movable vane so disposed that one edge may be in constant contact with the periphery of said impeller and so that one side may constantly traverse a portion of said partition; and means for maintaining said vane in contact with said periphery during rotation of said impeller, said means comprising (a) a first bar magnet carried by said vane and extending parallel to the vane's axis of arcuate movement, (b) a second bar magnet supported by said partition parallel to said first bar magnet and having its poles so disposed that it repels said first bar magnet, and (c) a third bar magnet also supported by said partition and having its poles so arranged that it attracts said first bar magnet.

2. In a pump, a combination including: a casing having inlet and outlet ports; a rotor comprising a plurality of axially aligned impellers each having two oppositely disposed lobes arranged at right angles to the lobes of the proximate impeller, said rotor so rotatably mounted within said casing that the lobes traverse an arcuate portion of the inner surface thereof; a stationary partition depending from a second portion of said inner surface substantially opposite from said arcuate portion, said partition extending to a line that is substantially as far from the axis of said rotor as is the aforementioned arcuate surface and so disposed within said casing that it is substantially parallel to said axis; a plurality of arcuately movable vanes each so disposed that one edge may be in constant contact with the periphery of one of the impellers and so that one side may constantly traverse a portion of said partition; and means individual to each of said vanes for maintaining the vane in contact with the periphery of the associated impeller during rotation thereof, each of said means comprising (a) a first bar magnet carried by the associated vane and extending parallel to the vane's axis of arcuate movement, (b) a second bar magnet supported by the casing parallel to said first bar magnet and having its poles so disposed that it repels said first bar magnet and (c) a third bar magnet also supported by said partition and having its poles so arranged that it attracts said first bar magnet.

3. In a pump, a combination including: a casing having inlet and outlet ports; first and second end plates affixed to said casing; a rotor comprising a pair of axially aligned impellers each having two oppositely disposed lobes arranged at right angles to the lobes of the other impeller, said rotor so rotatably mounted within said casing that the lobes traverse an arcuate portion of the inner surface thereof; a stationary partition depending from a second portion of said inner surface substantially opposite from said arcuate portion, said partition extending to a line that is substantially as far from the axis of said rotor as is the aforementioned arcuate surface and so disposed within said casing that it is substantially parallel to said axis; a pair of arcuately movable vanes each integrally attached to a pivotal arm and so disposed that one edge may be in constant contact with the periphery of one of said impellers; a common shaft for mounting said arms for angular movement; three members depending from the inner surface of said casing for so rotatably supporting and positioning said shaft that the surface of each of said vanes most remote from said shaft may traverse a portion of said partition, the two outermost of said members being free from connection with the adjacent end plates and the third member centrally disposed between said outermost members, said third member having a width equal to the combined width of said outermost members and the distance between said vanes; the width of each of said pivotal arms at its pivoting end being substantially equal to the distance between one of said outermost members and said third member to prevent axial movement of said arms along said mounting shaft.

References Cited by the Examiner

UNITED STATES PATENTS

| | | | |
|---|---|---|---|
| 200,036 | 2/1878 | Evens | 91—118 |
| 2,010,525 | 8/1935 | McHugh | 287—53 |
| 2,482,229 | 9/1949 | Weaver | 287—52 |
| 2,533,252 | 12/1950 | Hinckley | 103—124 |
| 2,717,555 | 9/1955 | Hinckley | 103—124 |
| 2,796,030 | 6/1957 | Nebel | 103—124 |
| 2,809,595 | 10/1957 | Adams et al. | 103—217 |
| 2,882,828 | 4/1959 | Hinckley | 103—124 |
| 2,952,249 | 9/1960 | Conover | 103—136 |

FOREIGN PATENTS 258,903   12/1927   Great Britain.

DONLEY J. STOCKING, *Primary Examiner.*

JOSEPH H. BRANSON, Jr., WILBUR J. GOODLIN,
*Examiners.*